Sept. 15, 1931.  A. M. REES  1,823,842
WHEEL RIM
Filed March 13, 1928  2 Sheets-Sheet 1
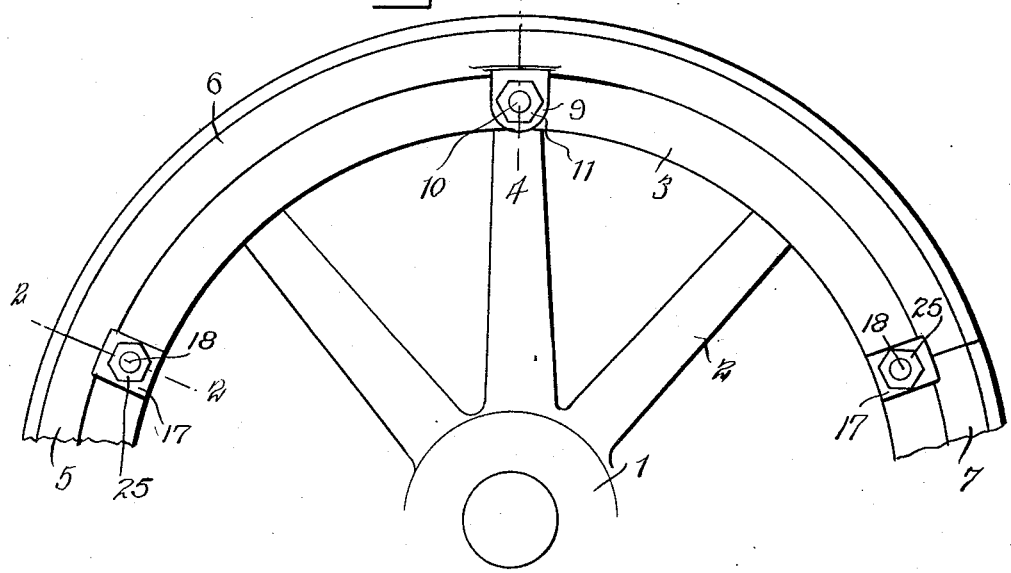
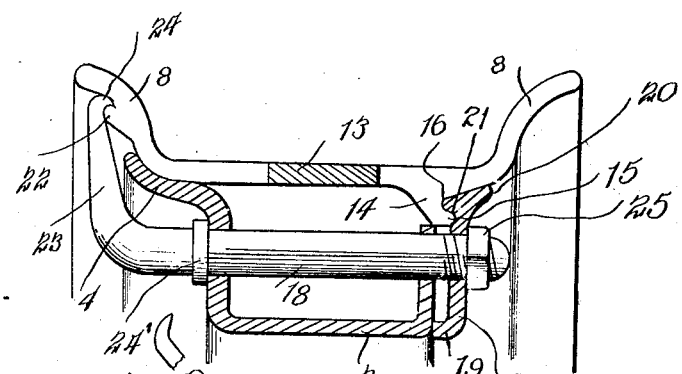
Inventor
A. M. Rees
By Lacey & Lacey, Attorneys Sept. 15, 1931.     A. M. REES     1,823,842
WHEEL RIM
Filed March 13, 1928     2 Sheets-Sheet 2
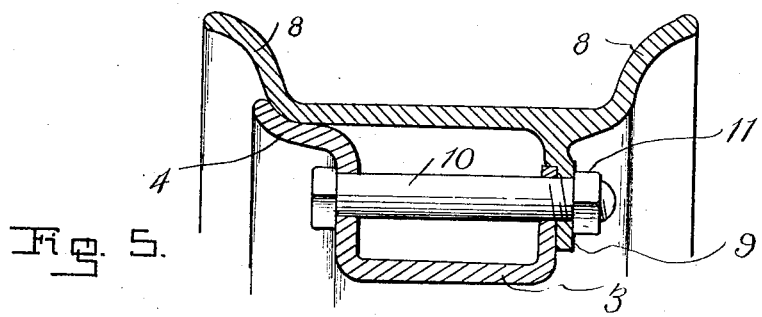
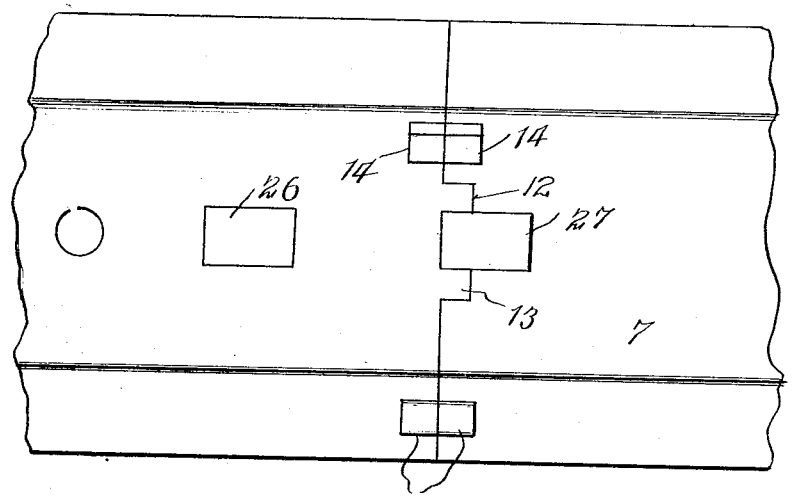
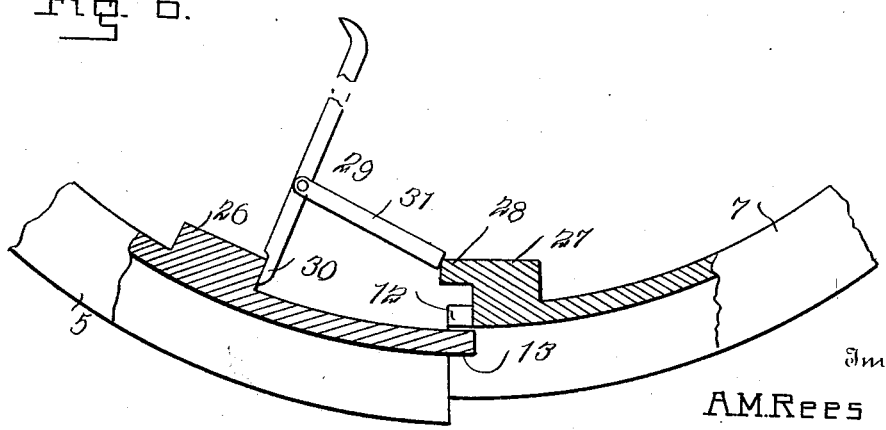
Inventor
A.M.Rees
By
Lacey & Lacey, Attorneys Patented Sept. 15, 1931

1,823,842

UNITED STATES PATENT OFFICE

ALICE M. REES, OF TULSA, OKLAHOMA

WHEEL RIM

Application filed March 13, 1928. Serial No. 261,273.

This invention relates to detachable wheel rims and has for its object the provision of a rim for carrying pneumatic tires of such construction that it may be very easily removed from the wheel felly and from the tire or fitted to a tire and a wheel felly and be effectually held against both lateral and circumferential movement upon the felly. The rim is also provided with means to facilitate its expansion into a tire or its contraction for removal from the tire. The invention is illustrated in the accompanying drawings and will be hereinafter fully set forth and particularly defined.

In the drawings:

Figure 1 is a side elevation of a portion of a wheel having my improved rim applied thereto;

Fig. 2 is a transverse section on the line 2—2 of Fig. 1;

Fig. 3 is an enlarged detail longitudinal section through one joint of the rim;

Fig. 4 is a transverse section on the line 4—4 of Fig. 1;

Fig. 5 is a plan view of one joint of the rim viewing the inner circumference of the same, and Fig. 6 is a longitudinal section similar to Fig. 3 but showing a different position of the members of the rim.

In the drawings, the reference numeral 1 indicates a hub and 2 the spokes of a wheel which may be of any approved form and carry a felly 3. The felly, as shown clearly in Figs. 2 and 4, is of channel formation and has one side extended outwardly and radially to provide a flange 4 against which the rim may abut and be clamped when the rim is in place. The rim is preferably constructed in three sections, indicated at 5, 6 and 7, which are arcuate in side view and the combined lengths of which equal the circumference of the felly. The sections of the rim are of channel formation having the side flanges or walls 8 which form seats for the tire in a well-known manner, and between the ends of each rim section a lug 9 is formed on the inner side of the same to project from the inner circumference thereof against the adjacent side of the felly and be clamped thereto by a bolt 10 and nut 11, this construction and arrangement positively preventing circumferential movement of the rim upon the felly. The sections are also each constructed with a recess 12 in one end and a projecting lug or tooth 13 at the opposite end which is adapted to fit snugly in the recess in the meeting end of an adjacent section whereby the alinement of the sections will be effected and maintained. At their meeting ends, the rim sections are also provided upon their inner circumferences with lugs or beads to be engaged by securing devices whereby the rim will be firmly secured upon the felly and held against relative transverse movement. At one side of the rim these lugs or beads are formed on the base portion of the section, as shown at 14, and are adapted to engage the edge of the adjacent side flange or wall of the felly, as shown most clearly in Fig. 2. On their outer sides, these lugs 14 are each formed with a tooth 15 defining a groove or recess 16 and a loose lug or bracket 17 is provided to cooperate therewith, the said bracket being provided between its upper and lower ends with an opening to accommodate the fastening bolt 18 and provided at its lower end with a lug or foot 19 adapted to bear against the side of the felly. At its upper end, the lug is formed with a head 20 adapted to bear against the under side of the adjacent rim sections to bridge the joint between the same and also having its inner surface, as shown at 21, properly shaped to engage in the recess 16 and around the bead 15. At the opposite side of the rim, the rim sections are formed on their flanges with beads 22 and the bolt 18 has its rear end formed into a radial foot 23 terminating in a lug 24 which is adapted to engage the beads 22 and bridge the joint between the rim sections, as will be understood. The bolt is also provided with a shoulder or abutment 24' and a nut 25 is provided to engage the threaded front end of the bolt and be turned home against the lug or bracket 17.

The rim having been assembled with the tire and the tire inflated, the rim carrying the tire is pushed sidewise over the felly until the rear flange of the rim engages the extended flange 4 of the felly, as shown in Figs. 2 and 4. The bolt 18 is then inserted through the felly from the rear until the abutment 24' engages the felly at which instant the hook 24 will be engaged with the beads 22 on the rim. The loose lug or bracket 17 is then fitted over the threaded end of the bolt to engage the lug 14 on the rim and the nut 25 is then engaged with the bolt and turned home against said lug. As the nut is turned home, the lug 17 will obviously be forced into clamping engagement with the lug 14 and the rim will be firmly clamped against the foot 23 and hook 24 at the end of the same. It will thus be seen that the rim is very easily mounted on the felly and is firmly secured against both transverse and circumferential relative movement.

The rim sections 5 and 7 are provided on their inner circumferences adjacent their meeting ends with lugs 26 and 27 respectively, the lug 26 being merely a projection on the rim section 5, while the lug 27 is formed with an overhanging ledge 28 on its side presented to the end of the section 7. These lugs are provided for use in expanding or contracting the rim and to effect the expansion or contraction a rim tool, shown at 29, is provided. This tool consists of a long lever having one end notched or formed into a claw, as indicated at 30, and a fulcrum bar 31 pivoted to the lever between the ends of the latter. When the rim is to be contracted, as indicated in Fig. 3, the fulcrum bar 31 is placed against the lug 26 and the recessed end of the lever is engaged under the ledge 28 of the lug 27, after which the lever is swung toward the rim so that the engagement between the lever and the ledge 28 will effect a prying or lifting action upon the lug 27 and shift the rim section 7 relative to the section 5 so that the rim will be collapsed, as indicated in Fig. 6. To expand the rim within a tire, the rim tool is reversed so that the lever will bear against the lug 26 and the bar 31 will bear against the lug 27, as shown in Fig. 6, whereupon if the lever be swung toward the lug 27, the rim sections will be forced apart and will slip into alinement, as will be understood.

The construction of my device is very efficient and permits a ready collapse or expansion of the rim.

Having thus described the invention, I claim:

In combination with a wheel felly having a circumferential flange about one side, a rim fitting about said felly and consisting of circumferential sections having their ends abutting, said rim having tire retaining side flanges, abutting lugs at the meeting ends of the rim sections facing transversely thereof between their flanges and extending towards the felly at the unflanged side thereof and having lips projecting outwardly beyond the felly, other abutting lugs at the meeting ends of said tire sections formed upon their flanges at the opposite side of the rim from the first lugs and spaced from but facing the outer side edges of the flanges, bolts passed transversely through said felly at the abutting ends of the rim sections and each having a collar near one end to limit its movement through the felly and its other end portion threaded and projecting from the felly, the first-mentioned end of each bolt having a head formed integral therewith and extending transversely from the bolt beyond the flange of the felly, means on the bolt heads for gripping the lugs upon the flanges of abutting rim sections in bridging relation to the rim sections, cleats fitted upon the threaded ends of said bolts and bearing against the unflanged side of the felly and having hooked ends projecting from the felly in bridging relation to abutting ends of the rim sections and gripping the lips of the first-mentioned lugs, and securing nuts for said cleats threaded upon said bolts.

In testimony whereof I affix my signature.

ALICE M. REES. [L. S.]